United States Patent
Lee (10) Patent No.: US 9,810,592 B2
(45) Date of Patent: Nov. 7, 2017

(54) ROTOR, AND TORQUE SENSOR AND ELECTRONIC POWER STEERING SYSTEM INCLUDING THE SAME

(71) Applicant: LG INNOTEK CO., LTD., Seoul (KR)

(72) Inventor: Chang Hwan Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/234,274

(22) Filed: Aug. 11, 2016

(65) Prior Publication Data

US 2017/0052077 A1 Feb. 23, 2017

(51) Int. Cl.
| | |
|---|---|
| *G01L 3/04* | (2006.01) |
| *G01L 3/10* | (2006.01) |
| *H02K 15/03* | (2006.01) |
| *B62D 5/04* | (2006.01) |
| *B62D 6/10* | (2006.01) |
| *G01L 25/00* | (2006.01) |
| *G01L 5/22* | (2006.01) |

(52) U.S. Cl.
CPC ............ *G01L 3/101* (2013.01); *B62D 5/0403* (2013.01); *B62D 6/10* (2013.01); *H02K 15/03* (2013.01); *G01L 3/04* (2013.01); *G01L 3/10* (2013.01); *G01L 3/104* (2013.01); *G01L 5/221* (2013.01); *G01L 25/003* (2013.01)

(58) Field of Classification Search
CPC ... G01L 3/104; G01L 3/10; G01L 3/04; G01L 25/003; G01L 5/221; H02K 15/03

USPC ...... 73/862.331–862.336, 862.191, 862.193, 73/862.08; 310/156.12, 156.13

See application file for complete search history.

(56) References Cited

U.S. PATENT DOCUMENTS

| | | | | |
|---|---|---|---|---|
| 8,390,276 | B2 * | 3/2013 | McDonald | G01D 5/145 324/174 |
| 8,482,177 | B2 * | 7/2013 | Kim | H02K 15/03 310/156.08 |
| 8,584,532 | B2 * | 11/2013 | Lee | G01L 25/003 73/862.191 |
| 8,776,618 | B2 * | 7/2014 | Lee | G01L 25/003 73/862.08 |
| 9,121,783 | B2 * | 9/2015 | Lee | G01L 25/003 |
| 9,551,622 | B2 * | 1/2017 | Lee | G01L 25/003 |
| 2010/0180696 | A1 * | 7/2010 | Islam | G01L 3/104 73/862.332 |
| 2010/0244606 | A1 * | 9/2010 | Kim | H02K 15/03 310/156.13 |
| 2012/0266695 | A1 * | 10/2012 | Lee | G01L 25/003 73/862.191 |

(Continued)

*Primary Examiner* — Jonathan Dunlap (74) *Attorney, Agent, or Firm* — Birch, Stewart, Kolasch & Birch, LLP (57) ABSTRACT

The present invention relates to a rotor including a shaft sleeve having a shaft sleeve main body and a stopper formed to protrude outward from an end portion of the shaft sleeve main body; a magnet disposed on an outer circumferential surface of the shaft sleeve and a lower portion thereof is supported by the stopper; and a fixing part which fixes an upper portion of the magnet, and a torque sensor and an electronic power steering system including the same. Due to the above structure, a broken magnet is prevented from deviating even when a magnet is broken.

20 Claims, 9 Drawing Sheets

(56) References Cited

U.S. PATENT DOCUMENTS

| | | | | |
|---|---|---|---|---|
| 2013/0276551 A1* | 10/2013 | Lee | .................... | G01L 25/003 73/862.325 |
| 2014/0013863 A1* | 1/2014 | Bae | .................... | G01L 3/10 73/862.333 |
| 2014/0251028 A1* | 9/2014 | Lee | .................... | G01L 25/003 73/862.191 |
| 2015/0330850 A1* | 11/2015 | Lee | .................... | G01L 25/003 73/862.191 |
| 2016/0054187 A1* | 2/2016 | Schoepe | ............... | G01L 3/104 73/862.335 |
| 2016/0187212 A1* | 6/2016 | Lee | .................... | G01L 25/003 73/862.191 |

* cited by examiner

ROTOR, AND TORQUE SENSOR AND ELECTRONIC POWER STEERING SYSTEM INCLUDING THE SAME

CROSS-REFERENCE TO RELATED APPLICATION

This application claims the benefit of Korean Patent Application No. P10-2015-0117263 filed on Aug. 20, 2015 and No. P10-2016-0052659 filed on Apr. 29, 2016 in the Korean Intellectual Property Office, the disclosure of which is incorporated herein by reference.

BACKGROUND

1. Field of the Invention

The present invention relates to a rotor and a torque sensor and electronic power steering system including the same.

2. Description of the Related Art

Generally, an auxiliary steering system using separate power is employed as an apparatus for ensuring steering stability of a vehicle.

Conventionally, a hydraulic apparatus has been employed as the above auxiliary steering system. Recently, however, an electronic power steering (EPS) system having a characteristic of small power loss and excellent accuracy has been used.

In the EPS system mentioned above, an electronic control unit (ECU) operates a motor according to travel conditions sensed by a speed sensor, a steering angle sensor, and a torque sensor to ensure cornering stability and to provide a rapid restoring force. Due to the above, it is possible for a driver to drive safely.

However, angular velocity as well as torque or a steering angle applied to a steering shaft must be measured to allow such a power system to intervene as a force manipulating a steering wheel.

Generally, a steering angle sensor is used to measure a rotation angle of the steering shaft and a torque sensor is employed for measuring steering torque.

Recently, however, a torque angle sensor (TAS) which can sense torque and a rotation angle simultaneously has been widely employed. However, since a process of manufacturing a TAS which detects a steering angle or steering angular velocity is complicated and there is high probability of a failure or malfunction of the TAS, a torque index sensor (TIS) adopting a principle of an index sensor is sometimes used.

Meanwhile, a magnet which is commonly employed in the TAS and the TIS is formed in a ring shape and is fixed to a yoke by bonding so that vertical movement of the magnet may be regulated.

However, when the magnet is fixed in only a vertical direction and a crack is generated on the magnet or the magnet is broken due to an external shock, the broken magnet can be deviated in a circumferential direction thereof so that the magnet deviates from an installation location thereof. There is a risk of the deviated magnet damaging other sensors installed around the magnet and the damaged magnet not forming a magnetic field normally, and thus there is a problem in that it is impossible to measure the torque of the steering shaft.

SUMMARY OF THE INVENTION

A technical objective of the present invention is to solve the above-mentioned problems, and the present invention provides a rotor having an improved mounting structure to prevent a magnet from being deviated from an original mounting location even when the magnet employed in a sensor sensing a torque of a steering shaft of a vehicle is broken, and a torque sensor and an electronic power steering system including the same.

According to one embodiment, the above object is achieved by a rotor including a shaft sleeve including a shaft sleeve main body and a stopper formed to protrude outward from an end portion of the shaft sleeve main body; a magnet disposed on an outer circumferential surface of the shaft sleeve and a lower portion thereof is supported by the stopper; and a fixing part which fixes an upper portion of the magnet.

Preferably, the fixing part may be provided with a first bonding layer formed by filling a bonding groove formed in an inner side of the magnet with an adhesive, and the bonding groove may be formed in the inner side of the magnet along a circumferential direction thereof.

Preferably, the fixing part may be provided with a ring-shaped fixing member and coupled to a fixing groove formed in the upper portion of the magnet.

Meanwhile, a concave-convex part may be formed on the upper surface of the magnet.

Here, the concave-convex part may be disposed in plural number along a circumferential direction of the upper surface of the magnet.

Further, the concave-convex part may be formed in a wedge shape.

Meanwhile, a fixing protrusion formed to protrude from a lower portion of the magnet may be coupled to a key groove formed by incising one section of the stopper.

In addition, a fixing protrusion formed to protrude from the stopper may be coupled to a key groove formed in a lower portion of the magnet.

Meanwhile, the stopper may be formed to protrude along the end portion of the sleeve shaft main body.

Here, an end portion of the stopper may be bent in a direction opposite a direction in which the magnet is inserted.

Also, a fixing protrusion formed to protrude from a lower portion of the magnet may be coupled to a stopper groove formed by forming the stopper to be bent.

The rotor may further include a second bonding layer formed between the outer circumferential surface of the shaft sleeve main body and an inner circumferential surface of the magnet.

According to another embodiment, the above object is achieved by a torque sensor including a housing; a stator disposed inside the housing; and a rotor disposed inside the stator, the rotor including a shaft sleeve including a shaft sleeve main body and a stopper formed to protruded outward from an end portion of the shaft sleeve main body; a magnet disposed on an outer circumferential surface of the shaft sleeve and a lower portion thereof is supported by the stopper; and a fixing part which fixes an upper portion of the magnet.

Preferably, a concave-convex part may be formed on the upper surface of the magnet.

In addition, a central point of the rotor may be adjusted by a jig which comes into contact with the concave-convex part.

Preferably, the fixing part may be provided with a first bonding layer formed by filling a bonding groove formed in an inner side of the magnet with an adhesive, and the bonding groove may be formed in the inner side of the magnet along a circumferential direction thereof.

Preferably, the fixing part may be provided with a ring-shaped fixing member and coupled to a fixing groove formed in the upper portion of the magnet.

According to still another embodiment, the above object is achieved by an electronic power steering system including a steering shaft and a torque sensor, wherein the torque sensor includes a housing; a stator disposed inside the housing; and a rotor disposed inside the stator, wherein the rotor includes a shaft sleeve including a shaft sleeve main body and a stopper formed to protrude outward from an end portion of the shaft sleeve main body; a magnet disposed on an outer circumferential surface of the shaft sleeve and a lower portion thereof is supported by the stopper; and a fixing part which fixes an upper portion of the magnet, and wherein the shaft sleeve of the rotor is connected to the steering shaft.

Preferably, a concave-convex part may be formed on the upper surface of the magnet.

In addition, a central point of the rotor may be adjusted by a jig which comes into contact with the concave-convex part.

BRIEF DESCRIPTION OF THE DRAWING

The above and other objects, features, and advantages of the present invention will become more apparent to those of ordinary skill in the art by describing in detail exemplary embodiments thereof with reference to the accompanying drawings, in which.

DETAIL DESCRIPTION OF THE EXEMPLARY EMBODIMENTS

Since the present invention may be modified in various ways and may have various embodiments, specific embodiments are illustrated in the drawings and are described in detail in the present specification. However, it should be understood that the present invention is not limited to the specifically disclosed embodiments, but includes all modifications, equivalents, and substitutes encompassed within the spirit and technical scope of the present invention.

The terms including ordinal numerals such as "second," "first," etc. may be used to describe various components, but the components are not limited by such terms. The terms are used only for the purpose of distinguishing one component from other components. For example, a first component may be designated as a second component without departing from the scope of the present invention. In the same manner, a second component may be designated as a first component. The term "and/or" encompasses both combinations of a plurality of related items disclosed and any item from among the plurality of related items disclosed.

When an arbitrary component is described as "being connected to" or "being linked to" another component, this should be understood as meaning that still another component(s) may exist between them or that the arbitrary component may be directly connected to or linked to the second component. In contrast, when an arbitrary component is described as "being directly connected to" or "being directly linked to" another component, this should be understood as meaning that no component exists between them.

In the description of the embodiment, when any one structural element is described as being formed "on" or "under" another structural element, it can refer to a case in which two components are directly in contact with each other or a case in which another structural element is indirectly disposed between two components. In addition, the term "on or under" may indicate an upward direction as well as a downward direction with respect to one structural element.

The terms used in the specification of the present application are used only for illustrating specific embodiments and are not intended to limit the present invention. A singular expression can include a plural expression unless otherwise indicated by its context. In the present specification, the terms "include" and "have" are intended to indicate that the illustrated features, numbers, steps, operations, components, parts, or combinations thereof exist and not to preclude the existence of one or more different features, numbers, steps, operations, components, parts, or combinations thereof or the possibility of an addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary should be understood as having meanings identical to those used in the context of a related art, and are not to be construed as having an ideal or excessively formal meaning unless such is obviously specified in the present specification.

Hereinafter, the embodiment of the present invention will be described in detail with reference to the accompanying drawings. Components which are the same as or correspond to other components which are already illustrated may be indicated by the same reference numerals, and descriptions thereof will be omitted.

Rotors 1, 1a, and 1b according to embodiments of the present invention may include a structure for preventing a deviation of a magnet and a structure for preventing a slipping of the magnet.

A deviation-preventing structure may prevent a broken magnet from being deviating in a radial direction when the magnet is broken.

In addition, a slip-preventing structure may prevent the magnet from slipping in a circumferential direction thereof.

Hereinafter, the deviation-preventing structure and the slip-preventing structure of the rotors 1, 1a, and 1b will be described.

Referring to FIGS. 1 to 5, the rotor 1 according to one embodiment of the present invention may include a shaft sleeve 100, a magnet 200, and a fixing part. Here, the fixing part may be a first bonding layer 300 which fixes an upper portion of the magnet 200 to an outer circumferential surface of the shaft sleeve 100.

The shaft sleeve 100 is connected to a steering shaft (not shown). Further the shaft sleeve 100 may be rotated in response to a rotation of the steering shaft.

The steering shaft may be coupled to an inner circumferential surface of the shaft sleeve 100. Here, the shaft sleeve 100 may be formed in a long cylindrical shape.

The shaft sleeve 100 may include a cylindrically shaped shaft sleeve main body 110, a stopper 120, and a key groove 130.

The shaft sleeve main body 110 may be formed in a long cylindrical shape, and the steering shaft may be coupled to an inner circumferential surface of the shaft sleeve main body 110.

The stopper 120 may be formed at an end portion of one side of the shaft sleeve main body 110.

The stopper 120 may be formed to protrude outward along the end portion at a lower side of the shaft sleeve main body 110.

Here, although the structure in which the stopper 120 is formed to protrude outward at a lower side of the shaft sleeve main body 110 along the circumferential direction is described as one example, the present invention is not necessarily limited thereto. In other words, a plurality of stoppers 120 may be formed to be spaced apart from each other and protrude outward at the lower side of the shaft sleeve main body 110 along the circumferential direction.

In addition, an end portion of the stopper 120 may be bent in a direction of surrounding the magnet 200. In other words, as shown in FIGS. 4A and 4B, the end portion of the stopper 120 may be bent in a direction opposite a direction in which the magnet 200 is inserted.

Figure 4A:
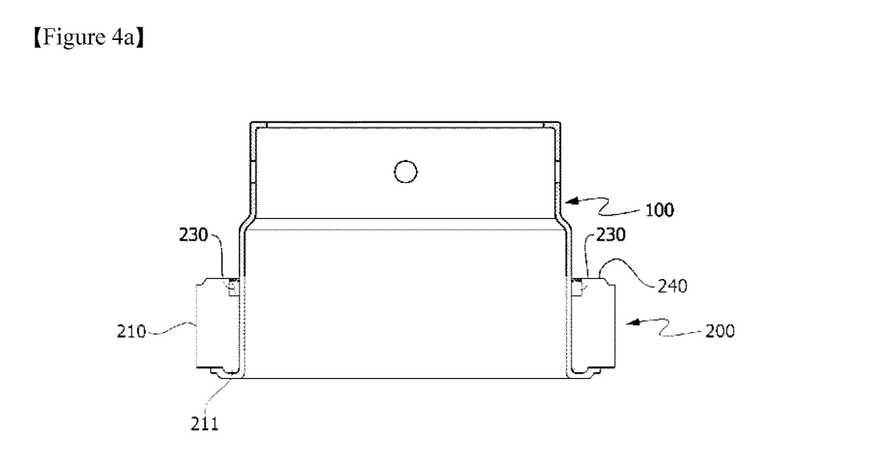
FIG. 4A is a view illustrating a bonding groove of the rotor according to the embodiment.
Figure 4B:
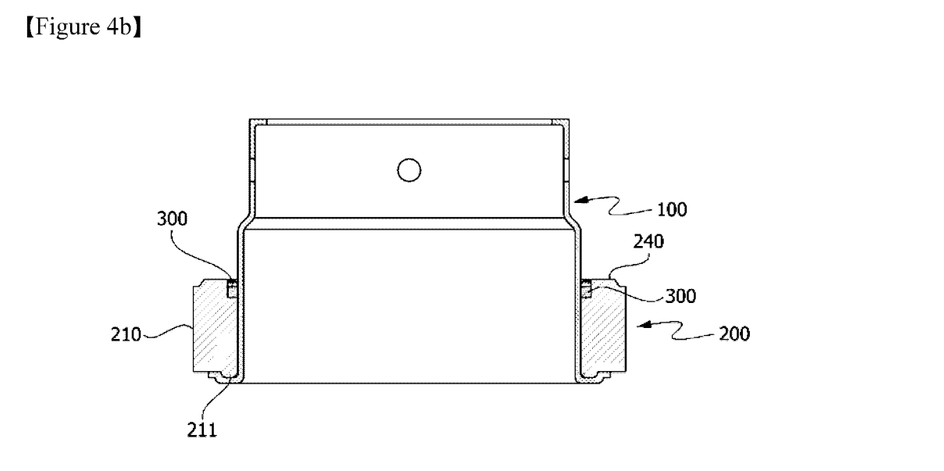
FIG. 4B is a view illustrating a first boding layer filled in the bonding groove of the rotor according to the embodiment.

For example, the stopper 120 may be formed to have an "L" shaped cross-section as shown in FIGS. 4A and 4B.

Therefore, one side of a lower portion of the magnet 200 may be supported by the stopper 120.

Here, when the shaft sleeve main body 110 is formed of a metallic material, the stopper 120 may be formed by a bending process. In addition, when the shaft sleeve main body 110 is injection-molded with a resin material, the stopper 120 may be formed integrally with the shaft sleeve main body 110 via molding.

Figure 3:
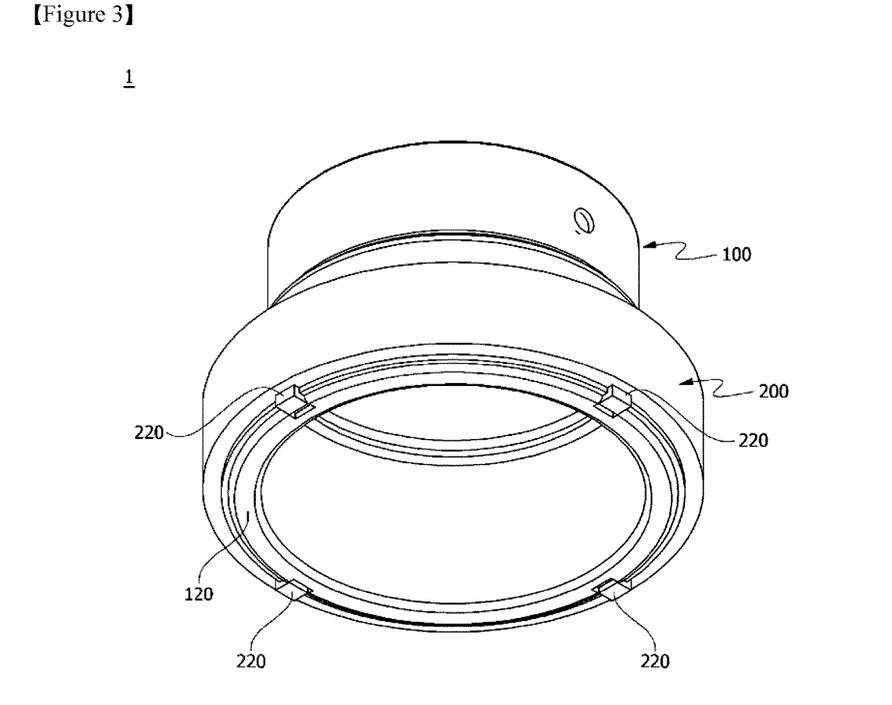
FIG. 3 is a lower perspective view illustrating the rotor according to the embodiment.

The key groove 130 may be formed by incising one section of the stopper 120. As shown in FIG. 3, a plurality of key grooves 130 may be formed. In addition, the key groove 130 is coupled to a portion which protrudes from the magnet 200 to form the slip-preventing structure so that a slipping of the magnet 200 caused by a rotation of the shaft may be prevented.

The magnet 200 is installed to rotate in response to a rotation of the shaft sleeve 100, and may have a ring shape on which an N pole and an S pole are arranged to alternate along an outer circumferential surface thereof.

The magnet 200 may include a magnet main body 210, a fixing protrusion 220 fitting into the key groove 130 of the shaft sleeve 100, and a bonding groove 230.

Figure 1:
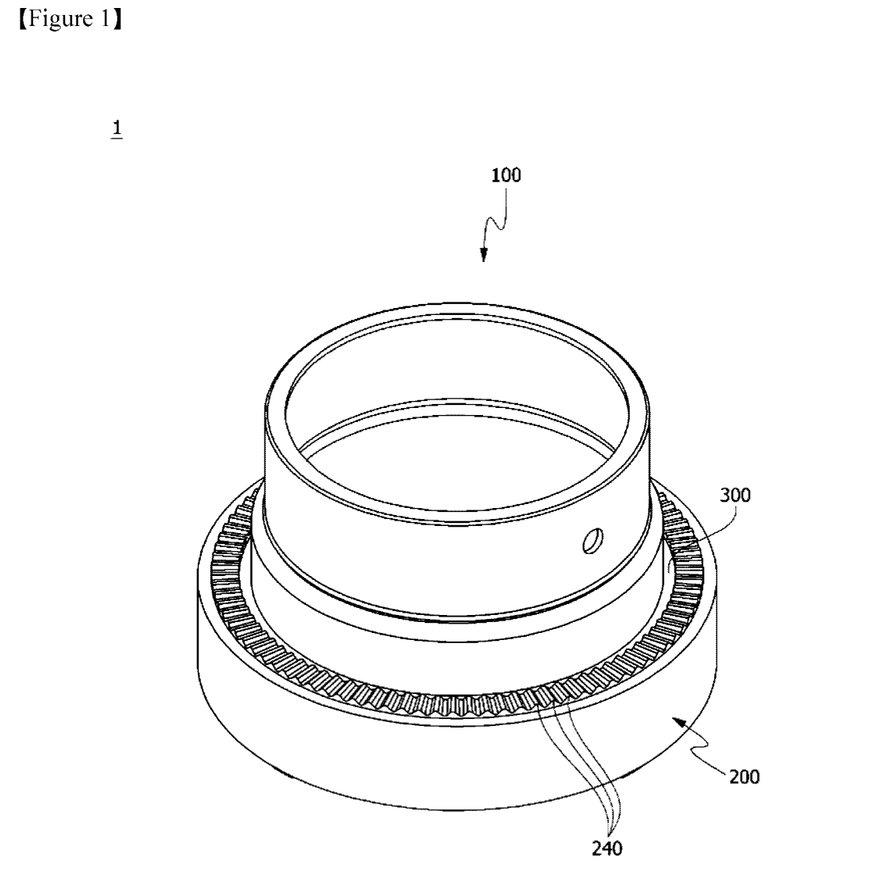
FIG. 1 is a perspective view illustrating a rotor according to an embodiment.
Figure 2:
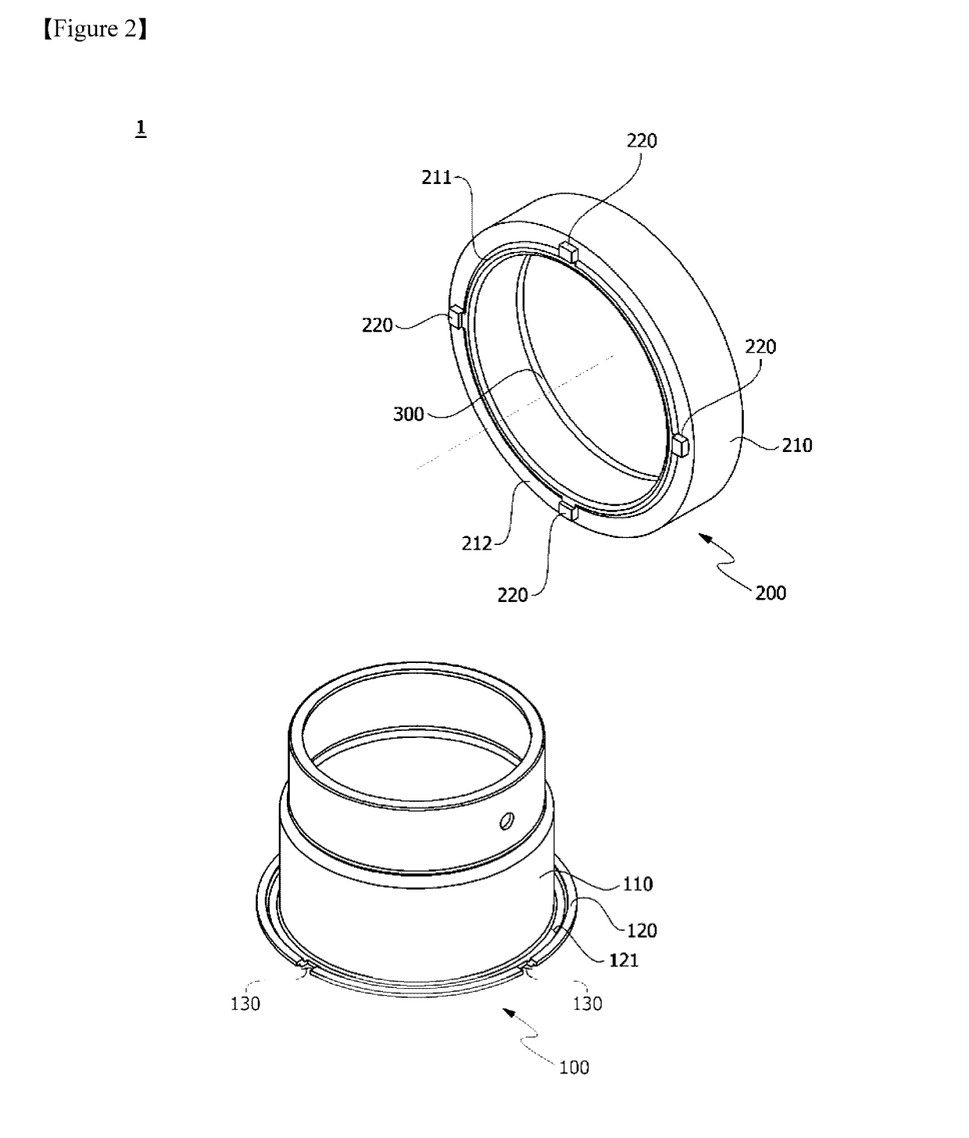
FIG. 2 is an exploded perspective view illustrating the rotor according to the embodiment.

As shown in FIG. 2, the magnet main body 210 may be formed in a ring shape and arranged on an outer circumferential surface of the shaft sleeve main body 110 to allow the stopper 120 to support one side of the magnet main body.

In addition, the magnet main body 210 may include a supporting protrusion 211 formed to be coupled to a stopper groove 121 formed by forming the stopper 120 to be bent.

The supporting protrusion 211 may protrude in an axial direction of the magnet main body 210 at a lower side of the magnet main body 210.

Thus, the supporting protrusion 211 may be supported by the stopper 120 to prevent the magnet main body 210 from being deviated by centrifugal force when the magnet main body 210 is rotated.

Referring to FIGS. 2 and 3, the fixing protrusion 220 may be coupled to the key groove 130 of the shaft sleeve 100. The fixing protrusion 220 may protrude in the axial direction of the magnet main body 210 at one side of a lower surface 212 of the magnet main body 210.

As shown in FIG. 3, a plurality of fixing protrusions 220 may be arranged and may be coupled to the key grooves 130 to prevent the magnet 200 from slipping in the circumferential direction according to a rotation of the shaft sleeve 100. That is, the slip-preventing structure of the rotor 1 may be formed by coupling the fixing protrusion 220 to the key groove 130.

Referring to FIG. 4A, the bonding groove 230 may be formed at an inner side of the magnet main body 210 along the circumferential direction thereof. For example, the bonding groove 230 may be formed to have a step at the inner side of the magnet main body 210 along the circumferential direction thereof.

In addition, referring to FIG. 4B, the bonding groove 230 may be filled with an adhesive to form the first bonding layer 300.

Therefore, the upper portion of the magnet 200 may be fixed by the first bonding layer 300 and the lower portion of the magnet may be supported by the stopper 120. Due to the above, it is possible to prevent pieces of a broken magnet from deviating from a mounting location through the deviation-preventing structure of the rotor 1 fixing the upper portion and the lower portion of the magnet 200 even when a crack is generated on the magnet 200, thereby avoiding damage to different components caused by the deviated pieces of the broken magnet.

For example, with respect to each piece of broken magnet, because an upper portion of the piece of broken magnet is fixed by the first bonding layer 300 and a lower portion of the piece is supported by the stopper 120, the piece of the broken magnet may be prevented from deviating from the mounting location through the deviation-preventing structure.

Meanwhile, the magnet 200 may further include a concave-convex part 240 formed on an upper end portion thereof.

The concave-convex part 240 may be formed in a concave-convex shape and formed on an upper surface of the magnet 200 along the circumferential direction thereof. At this time, the concave-convex shape may be a wedge shape to facilitate a coupling of the concave-convex part with a jig (not shown). In addition, the concave-convex shape may be obtained by a line shaped fine groove or by one protrusion or a plurality of protrusions.

Therefore, the concave-convex part 240 may come into contact with one end of the jig to provide friction force. Due to the above, a rotational force may be precisely transmitted to the concave-convex part 240 through the jig when a central point of the rotor 1 is adjusted.

Figure 5:
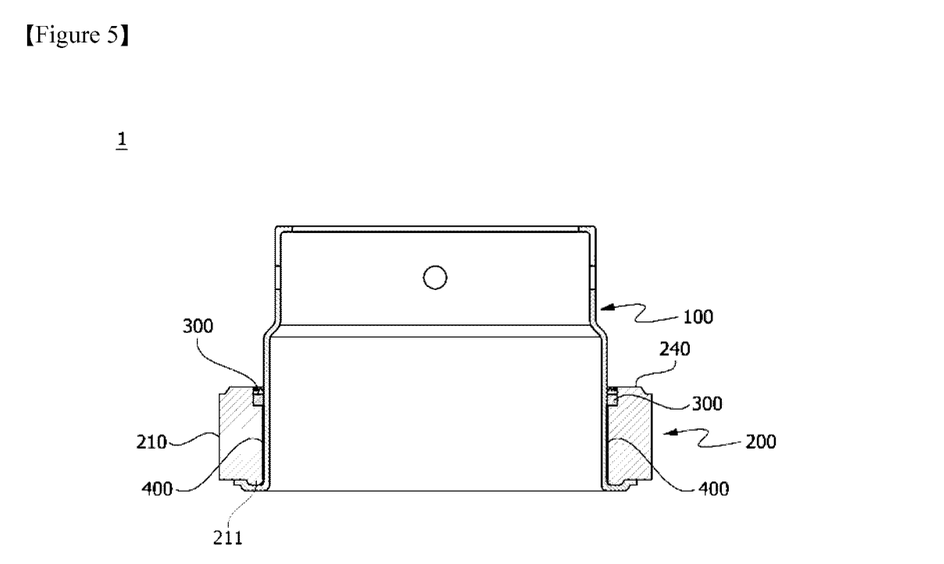
FIG. 5 is a cross-sectional view illustrating a second bonding layer of the rotor according to the embodiment.

Meanwhile, referring to FIG. 5, the rotor I may further include a second bonding layer 400.

The second bonding layer 400 may be formed between the outer circumferential surface of the shaft sleeve 100 and an inner circumferential surface of the magnet 200. That is, the shaft sleeve 100 and the magnet 200 may be coupled to each other by the second bonding layer. Therefore, the deviation-preventing structure may be further strengthened by the second bonding layer 400.

Here, an adhesive may be provided as the second bonding layer 400. Hereinafter, a rotor 1a according to another embodiment of the present invention will be described with reference to FIGS. 6 to 8. In the description of the rotor 1a, however, components which are the same as those constituting the rotor 1 described above are indicated by the same reference numerals, and descriptions thereof will be omitted.

When the rotor 1a is compared with the rotor 1, a fixing part and a magnet coupled to the fixing part of the rotor 1a differ from those of the rotor 1.

Referring to FIGS. 1 and 6 to 8, the rotor 1a may include a shaft sleeve 100, a magnet 200a, and a fixing part 300a. Here, the magnet 200a may include a magnet main body 210 having a supporting protrusion 211, a fixing protrusion 220 fitting into a key groove 130 of the shaft sleeve 100, a concave-convex part 240, and a fixing groove 250.

Figure 6:
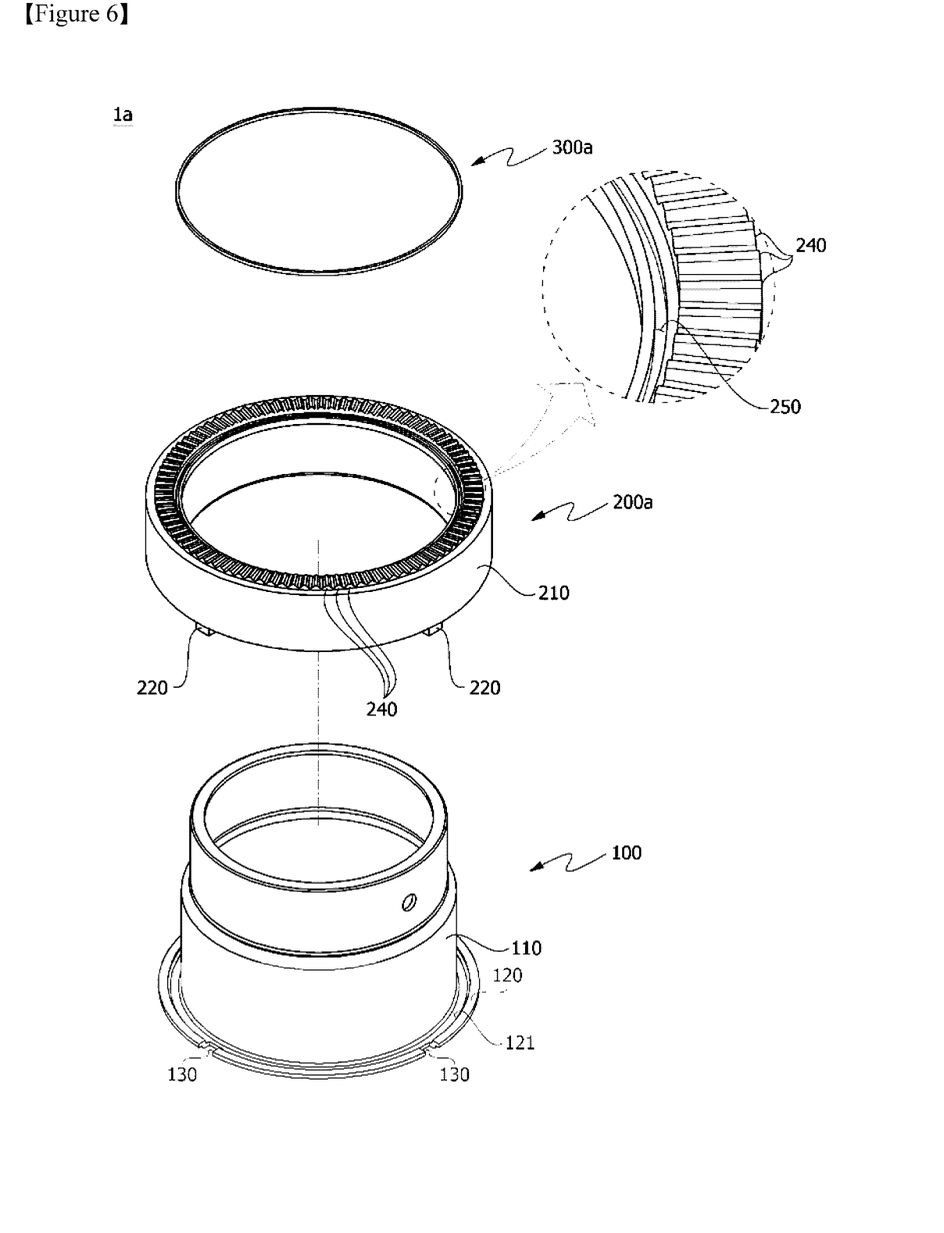
FIG. 6 is an exploded perspective view illustrating a rotor according to another embodiment.
Figure 7:
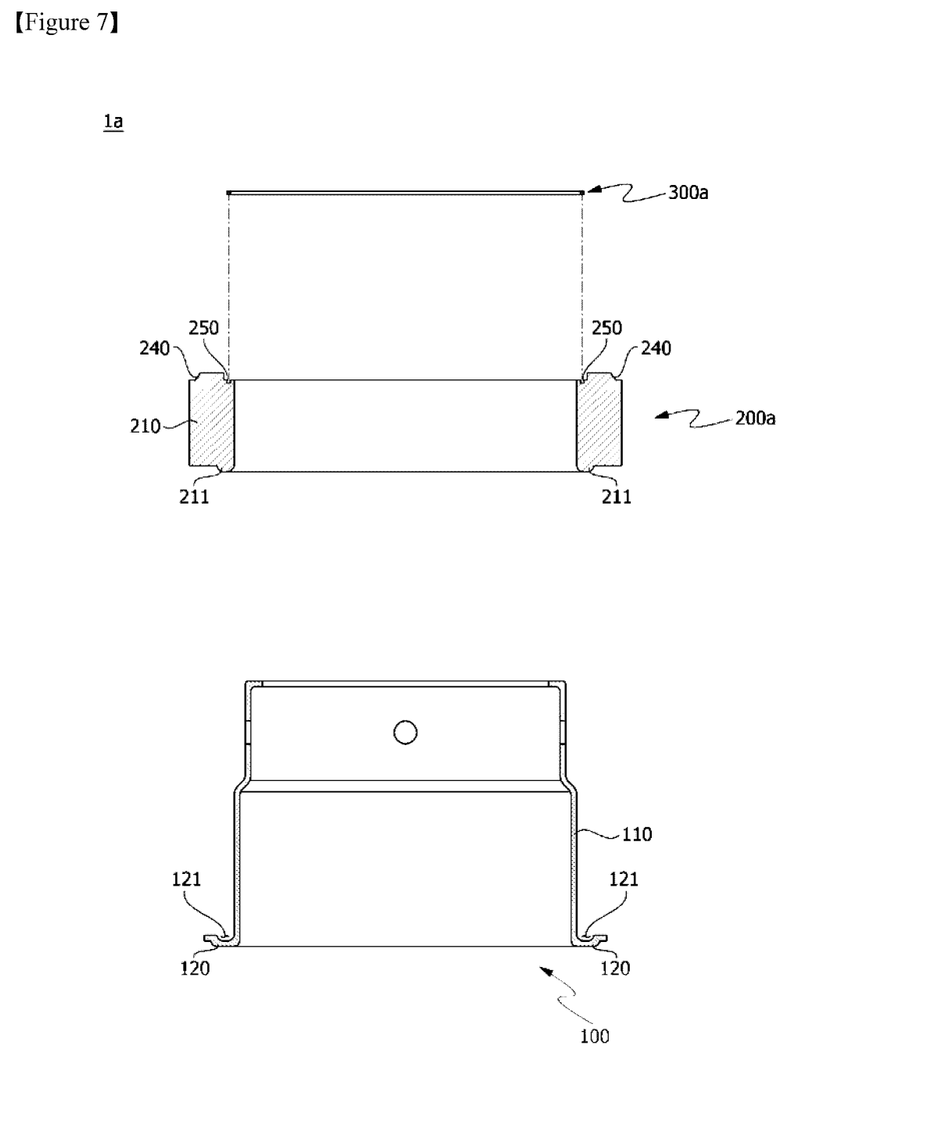
FIG. 7 is an exploded sectional view illustrating the rotor according to another embodiment.

As shown in FIGS. 6 and 7, the fixing groove 250 may be formed in an upper portion of the magnet 200a along a circumferential direction thereof. Here, although the fixing groove 250 formed in the upper portion of the magnet 200a is described and illustrated as an example, the present invention is not limited thereto. The fixing groove may also be formed in a side surface of the upper portion of the magnet 200a.

The fixing part 300a may be a fixing member having a ring shape. Also, the fixing member 300a may be disposed in the fixing groove 250. Here, the fixing member may be formed of a rubber material having elastic force.

Therefore, the upper portion of the magnet 200a may be fixed by the fixing member 300a, and a lower portion of the magnet may be supported by a stopper 120. Due to the above, pieces of the broken magnet may be prevented from deviating from a mounting location through the deviation-preventing structure of the rotor 1a fixing the upper portion and a lower portion of the magnet 200a even when a crack is generated on the magnet 200a, thereby avoiding damage to different components caused by deviated pieces of the broken magnet.

Even though the rotor 1a in which the upper portion of the magnet 200a is fixed using the fixing groove 250 and the fixing member 300a is illustrated and described as an example, the present invention is not necessarily limited thereto, and the upper portion of the magnet 200a may be fixed using the fixing member 300a such as an O-ring without forming the fixing groove 250. However, it is preferable that the rotor 1 a include a structure such as the fixing groove 250 which can guide an installation location to set a location of the fixing member 300a.

Figure 8:
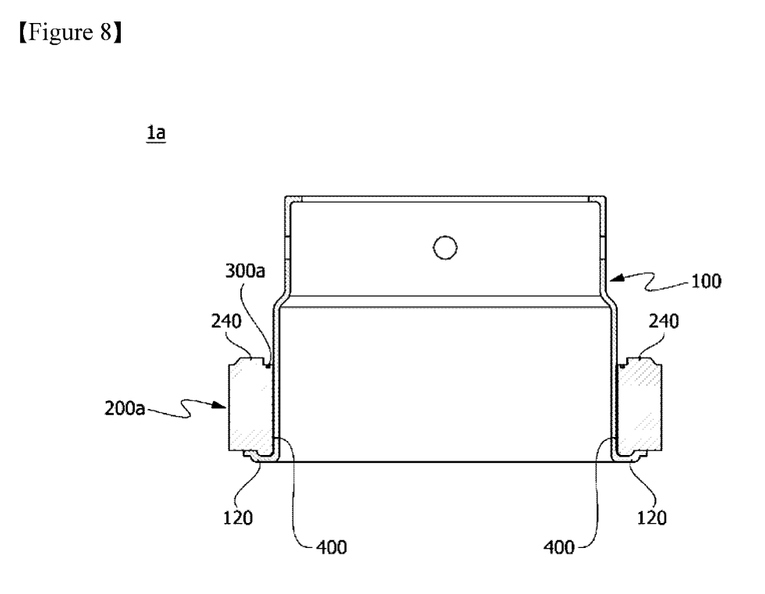
FIG. 8 is a cross-sectional view illustrating the rotor according to another embodiment.

Meanwhile, as shown in FIG. 8, the rotor 1a may further include the second bonding layer 400.

Hereinafter, the rotor 1b according to still another embodiment of the present invention will be described with reference to FIG. 9. In the description of the rotor 1b, however, components which are the same as those constituting the rotors 1 and 1a described above are indicated by the same reference numerals, and descriptions thereof will be omitted. When the rotor 1b is compared with the rotors 1 and 1a, locations of a key groove and a fixing protrusion of the rotor 1b, which constitute the slip-preventing structure, differ from those of the rotors 1 and 1a.

The rotor 1b may include a shaft sleeve 100a, a magnet 200b, and fixing parts 300 and 300a. In addition, the rotor 1b may further include a second bonding layer 400.

The shaft sleeve 100a may include a shaft sleeve main body 110, a stopper 120, and a fixing protrusion 140.

The magnet 200b may include a magnet main body 210 and a key groove 260 which fits the fixing protrusion 140 of the shaft sleeve 100a.

Here, the magnet 200b may further include a bonding groove 230 formed to correspond to the fixing part 300 or the fixing groove 250 formed to correspond to the fixing part 300a.

In addition, the key groove 260 may be formed in one side of a lower portion of the magnet main body 210.

Figure 9:
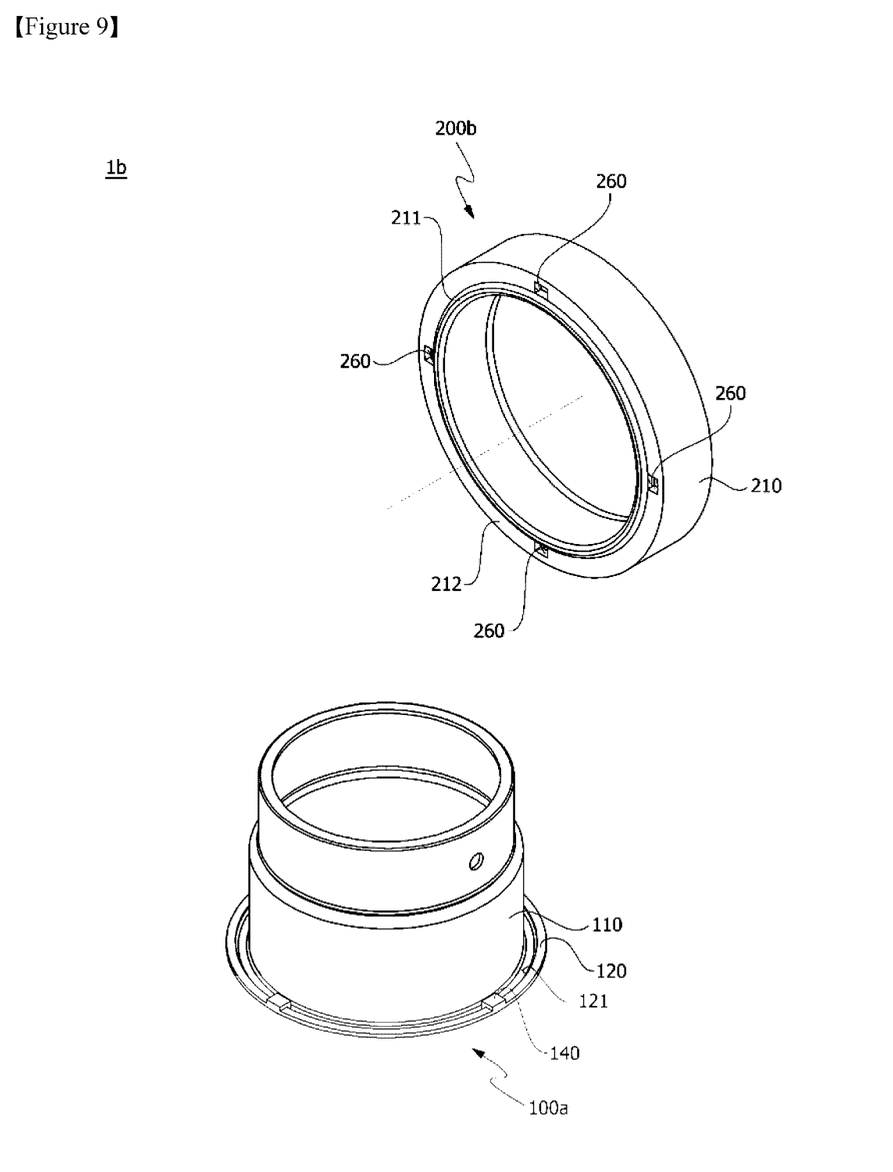
FIG. 9 is an exploded perspective view illustrating a rotor according to still another embodiment.

As shown in FIG. 9, the fixing protrusion 140 of the shaft sleeve 100a is formed on the stopper 120, and the key groove 260 may be formed in the magnet 200b. Due to the above, the rotor 1b according to still another embodiment of the present invention may be formed by coupling the fixing protrusion 140 and the key groove 260 with each other. Therefore, even when the shaft sleeve 100a is rotated, a coupling between the fixing protrusion 140 and the key groove 260 may prevent the magnet 200b from slipping in the circumferential direction thereof.

In summary, since the upper portion of the magnets 200, 200a, and 200b of the rotors 1, 1a, and 1b are fixed by the fixing parts 300 and 300a and the lower portion of the magnet is supported by the stopper 120, a broken magnet may be prevented from deviating in the circumferential direction even when a crack or breakage is generated on the magnets 200, 200a, and 200b. Consequently, a broken magnet deviated from a mounting location thereof may be prevented from damaging other components.

That is, in the rotors 1, 1a, and 1b, a stable structure for mounting the magnet 200 may be provided by using the fixing parts 300 and 300a and the stopper 120.

In addition, it is possible to prevent the magnets 200, 200a, and 200b from slipping in the circumferential direction through a coupling between the fixing protrusions 140 and 220 and the key grooves 130 and 260 in the rotors 1, 1a, and 1b.

Figure 10:
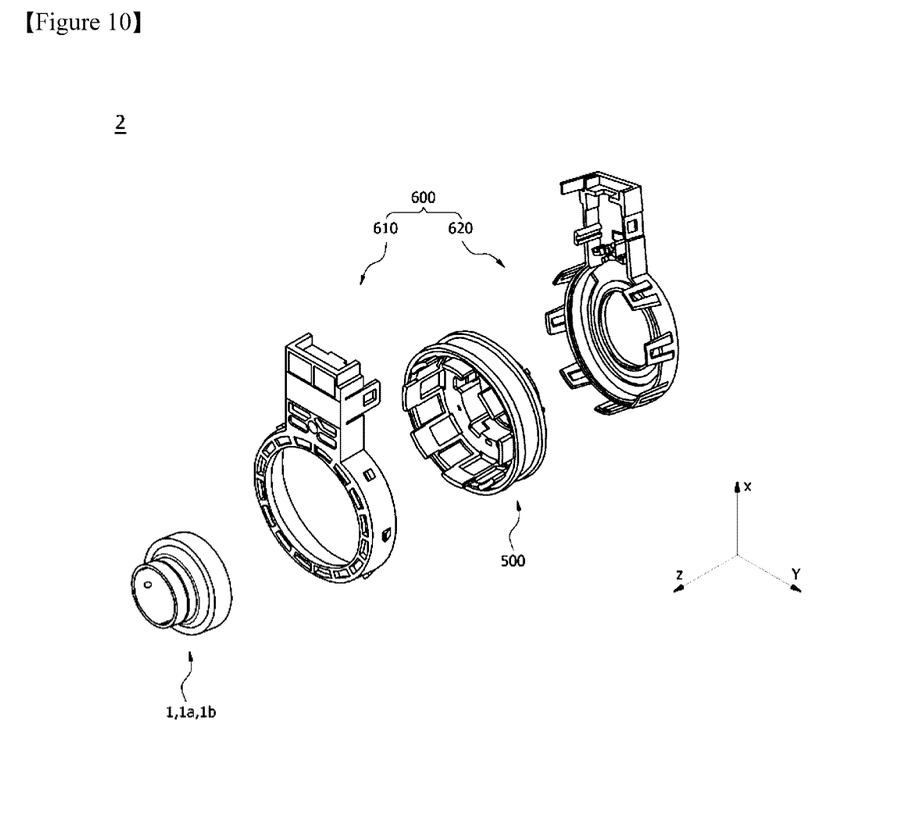
FIG. 10 is an exploded perspective view illustrating a torque sensor according to an embodiment.

Referring to FIG. 10, a torque sensor 2 according to one embodiment of the present invention may measure torque of a steering shaft (not shown).

The torque sensor 2 may include the rotor 1, 1a, or 1b, a stator 500, and a housing 600. Here, the housing 600 may include an upper case 610 and a lower case 620.

The upper case 610 and the lower case 620 of the housing 600 are coupled to each other to form an appearance of the torque sensor 2, and the rotor 1, 1a, or 1b and the stator 500 may be disposed inside the housing 600.

The rotor 1, 1a, or 1b may be connected to the steering shaft and rotated in response to a rotation of the steering shaft. In addition, the rotor 1, 1a, or 1b may be disposed inside the stator 500.

In addition, an electronic power steering (EPS) system according to one embodiment of the present invention may include the torque sensor 2.

Here, the torque sensor 2 may be connected to a steering shaft of the EPS system. A lower portion of the magnet disposed in the rotor having the structure described above and a torque sensor and EPS system including the rotor according to one embodiment of the present invention is supported by a stopper, and an upper portion of the above magnet can be supported using an adhesive or a fixing member. Therefore, a broken magnet may be prevented from deviating from an original bonding location thereof even when a magnet is broken by an external shock. Consequently, a broken magnet deviated from a mounting location thereof may be prevented from damaging other components.

Furthermore, since the slip-preventing structure for the magnet is formed using the fixing protrusion and the key groove, a slipping of the magnet caused by a rotation of the shaft sleeve can be prevented to avoid a malfunction of the torque sensor.

Although the present invention has been described with reference to the embodiments in the above detailed description, one skilled in the art should understand that the present invention may be variously changed and modified without departing from the spirit and scope of the present invention defined in the appended claims. In addition, differences related to such changes and modifications should be interpreted as being encompassed within the scope of the present invention defined in the appended claims.

REFERENCE NUMERALS 1, 1a, 1b: Rotor
2: Torque sensor
100, 100a: Shaft sleeve
200, 200a, 200b: Magnet
300, 300a: Fixing part
400: Second bonding layer
500: Stator
600: Housing

What is claimed is:

1. A rotor comprising, a shaft sleeve including a shaft sleeve main body and a stopper formed to protrude outward from an end portion of the shaft sleeve main body;
a magnet disposed on an outer circumferential surface of the shaft sleeve, wherein a lower portion thereof is supported by the stopper; and
a fixing part which fixes an upper portion of the magnet.

2. The rotor of claim 1, wherein the fixing part is provided with a first bonding layer formed by filling a bonding groove formed in an inner side of the magnet with an adhesive, and the bonding groove is formed in the inner side of the magnet along a circumferential direction thereof.

3. The rotor of claim 1, wherein the fixing part is provided with a ring-shaped fixing member and coupled to a fixing groove formed in the upper portion of the magnet.

4. The rotor of claim 1, wherein a concave-convex part is formed on an upper surface of the magnet.

5. The rotor of claim 4, wherein the concave-convex part is disposed in plural number along a circumferential direction of the upper surface of the magnet.

6. The rotor of claim 5, wherein the concave-convex part is formed in a wedge shape.

7. The rotor of claim 1, wherein a fixing protrusion formed to protrude from the lower portion of the magnet is coupled to a key groove formed by incising one section of the stopper.

8. The rotor of claim 1, wherein a fixing protrusion formed to protrude from the stopper is coupled to a key groove formed in the lower portion of the magnet.

9. The rotor of claim 1, wherein the stopper is formed to protrude along the end portion of the sleeve shaft main body.

10. The rotor of claim 9, wherein an end portion of the stopper is bent in a direction opposite a direction in which the magnet is inserted.

11. The rotor of claim 10, wherein a supporting protrusion formed to protrude from the lower portion of the magnet is coupled to a stopper groove formed by forming the stopper to be bent.

12. The rotor of claim 1, further comprising a second bonding layer formed between an outer circumferential surface of the shaft sleeve main body and an inner circumferential surface of the magnet.

13. A torque sensor comprising,
a housing;
a stator disposed inside the housing; and
a rotor disposed inside the stator,
wherein the rotor comprises,
a shaft sleeve including a shaft sleeve main body and a stopper formed to protrude outward from an end portion of the shaft sleeve main body;
a magnet disposed on an outer circumferential surface of the shaft sleeve, wherein a lower portion thereof is supported by the stopper; and
a fixing part which fixes an upper portion of the magnet.

14. The torque sensor of claim 13, wherein a concave-convex part is formed on an upper surface of the magnet.

15. The torque sensor of claim 14, wherein a central point of the rotor is adjusted by a jig which comes into contact with the concave-convex part.

16. The torque sensor of claim 13, wherein the fixing part is provided with a first bonding layer formed by filling a bonding groove formed in an inner side of the magnet with an adhesive, and the bonding groove is formed in the inner side of the magnet along a circumferential direction thereof.

17. The torque sensor of claim 13, wherein the fixing part is provided with a ring-shaped fixing member and coupled to a fixing groove formed in the upper portion of the magnet.

18. An electronic power steering system comprising:
a steering shaft; and
a torque sensor,
wherein the torque sensor comprises:
a housing;
a stator disposed inside the housing; and
a rotor disposed inside the stator,
wherein the rotor comprises:
a shaft sleeve including a shaft sleeve main body and a stopper formed to protrude outward from an end portion of the shaft sleeve main body;
a magnet disposed on an outer circumferential surface of the shaft sleeve, wherein a lower portion thereof is supported by the stopper; and
a fixing part which fixes an upper portion of the magnet,
wherein the shaft sleeve of the rotor is connected to the steering shaft.

19. The electronic power steering system of claim 18, wherein a concave-convex part is formed on an upper surface of the magnet.

20. The electronic power steering system of claim 19, wherein a central point of the rotor is adjusted by a jig which comes into contact with the concave-convex part.

* * * * *